(12) United States Patent
Hartley et al.

(10) Patent No.: US 8,943,846 B1
(45) Date of Patent: Feb. 3, 2015

(54) ELECTRONIC THERMOSTAT

(71) Applicant: Red Dot Corporation, Tukwila, WA (US)

(72) Inventors: Jason Vance Hartley, Bonney Lake, WA (US); Peder Hamberg, Maple Valley, WA (US); Karl David Leingang, Kent, WA (US)

(73) Assignee: Red Dot Corporation, Tukwila, WA (US)

( * ) Notice: Subject to any disclaimer, the term of this patent is extended or adjusted under 35 U.S.C. 154(b) by 0 days.

(21) Appl. No.: 13/972,693

(22) Filed: Aug. 21, 2013

(51) Int. Cl.
| | |
|---|---|
| G05D 23/32 | (2006.01) |
| F25B 1/00 | (2006.01) |
| F25B 49/00 | (2006.01) |
| B60H 1/32 | (2006.01) |
| G05D 23/19 | (2006.01) |

(52) U.S. Cl.
CPC .................................... *G05D 23/19* (2013.01)
USPC .................. 62/158; 62/157; 62/230; 62/239; 62/243

(58) Field of Classification Search
USPC ........... 62/151, 155, 156, 157, 158, 230, 239, 62/243; 236/46 R; 165/267
See application file for complete search history.

(56) References Cited

U.S. PATENT DOCUMENTS

| | | | |
|---|---|---|---|
| 3,691,783 A | 9/1972 | Proctor | |
| 4,299,095 A * | 11/1981 | Cassarino | ........................ 62/155 |
| 4,510,480 A | 4/1985 | Rossi et al. | |
| 4,725,001 A | 2/1988 | Carney et al. | |
| 5,065,813 A | 11/1991 | Berkeley et al. | |
| 5,083,437 A | 1/1992 | Chacon | |
| 5,162,774 A | 11/1992 | Chacon | |
| 5,201,862 A | 4/1993 | Pettitt | |
| 5,270,952 A | 12/1993 | Adams et al. | |
| 5,285,648 A | 2/1994 | Bessler | |
| 5,322,217 A | 6/1994 | Brocx et al. | |
| 5,333,678 A | 8/1994 | Mellum et al. | |
| 5,477,701 A | 12/1995 | Kenyon et al. | |
| 5,481,884 A | 1/1996 | Scoccia | |
| 5,587,926 A * | 12/1996 | Chiu et al. | ....................... 702/45 |
| 6,066,843 A | 5/2000 | Scheremeta | |
| 6,293,114 B1 | 9/2001 | Kamemoto | |
| 6,330,802 B1 | 12/2001 | Cummings et al. | |
| 6,460,354 B2 | 10/2002 | Yabuki et al. | |
| 6,986,469 B2 * | 1/2006 | Gauthier et al. | ................. 236/51 |
| 8,011,199 B1 | 9/2011 | Chen et al. | |
| 2002/0056993 A1 | 5/2002 | Kennedy | |
| 2005/0120012 A1 | 6/2005 | Poth et al. | |
| 2008/0065926 A1 | 3/2008 | Poth et al. | |
| 2008/0183335 A1 | 7/2008 | Poth et al. | |

FOREIGN PATENT DOCUMENTS

WO        0192794 A1    12/2001

\* cited by examiner

*Primary Examiner* — Frantz Jules
*Assistant Examiner* — Daniel C Comings
(74) *Attorney, Agent, or Firm* — Lowe Graham Jones PLLC (57) ABSTRACT

Provided are apparatus, including electronic thermostats, for detecting temperatures and elapsed times and, in response to those temperatures and elapsed times, controlling the opening or closing of an electric circuit.

17 Claims, 6 Drawing Sheets

ELECTRONIC THERMOSTAT

BACKGROUND OF THE DISCLOSURE

1. Technical Field

The present disclosure relates, generally, to heat transfer systems, including heating, ventilation, and air condition (HVAC) systems and controls for such systems. More specifically, this disclosure provides apparatus, including electronic thermostats, for detecting temperatures and elapsed times and, in response to those temperatures and elapsed times, controlling the opening or closing of an electric circuit that provides electricity to a component connected to that electric circuit.

2. Description of the Related Art

Air conditioning, refrigeration, and other heat transfer systems include four core components: a compressor, a condenser, an expansion device, and an evaporator, each of which is in operable connection through a fluid circuit of refrigerant such as, for example, a chlorofluorocarbon (CFC), a hydrochlorofluorocarbon (HCFC), and a hydrofluorocarbon (HFC).

In a vehicle air conditioning system, such as an automobile or truck air conditioning system, the refrigerant is typically in heat exchange with ambient air within the vehicle compartment by means of the evaporator, or endothermic heat exchanger. As the liquid refrigerant passes through the evaporator, it absorbs heat from the ambient air and converts into a gaseous state. The gaseous refrigerant leaving the evaporator is drawn through a suction line into the compressor, which increases the gas pressure before it passes through the condenser, or exothermic heat exchanger, where it gives off heat and cools back to a liquid state under high pressure. The high pressure liquid refrigerant then passes through an expansion device, such as an expansion valve, wherein the fluid pressure is adiabatically decreased prior to re-entering the evaporator to repeat the cycle.

Compressors are typically connected to a control device that controls whether the compressor is operational. The compressor control device can be a clutch, which comprises an electromagnet that, when engaged, produces a strong magnetic field when current is applied thereby activating the compressor. The compressor control device can also be a fluid flow valve, which controls the flow of a fluid to a hydraulic compressor.

When the control device is disengaged, the compressor stops functioning; when the control device is engaged, the compressor starts functioning. When the compressor is operational, it takes in and compresses cool, low pressure gas from the evaporator and discharges hot, high pressure gas, which passes to the condenser where heat is released by condensation, which thereby converts the high pressure gas to a high pressure liquid that passes through the expansion valve (generally a narrowing inlet) that converts the high pressure liquid refrigerant to a gaseous state before returning to the evaporator.

In contrast, when the compressor in not operational, it cannot compress the cool, low pressure gas exiting the evaporator into hot, high pressure gas, which limits the release of heat by condensation. The low pressure liquid that passes through the expansion valve, therefore, remains a low pressure liquid as it enters through the evaporator, which is ineffective in extracting heat from the ambient air.

Heat absorption by the refrigerant at the evaporator causes the evaporator to cool. As the temperature of the evaporator falls, water vapor from the atmosphere surrounding the evaporator condenses on the evaporator. If the evaporator temperature falls below the freezing point of water, the condensation on the evaporator freezes and begins to accumulate. If the evaporator remains below the freezing point of water for an extended period of time, the ice accumulation on the evaporator can become excessive thereby insulating the evaporator and reducing the efficiency of heat transfer.

Heat exchange systems often employ one or more operating control device(s) to regulate on and off cycling and to maintain desired system temperatures and pressures. Heat exchange systems also frequently employ one or more safety control(s) to stop system operation under unsafe or undesirable conditions. Depending upon the precise application, heat exchange system operating control device(s) respond to temperature, pressure, humidity, liquid levels, input from other controls, and manual intervention.

Heat exchange systems can employ an operating control device that detects the temperature at one or more system component(s). For example, a heat exchange system can employ an operating control device that detects the temperature of an evaporator and, in response to a predetermined temperature at the evaporator core, controls the operation of an electric circuit that supplies electricity to another system component, such as a compressor control device.

In a typical heat exchange system, such an operating control device detects a predetermined lower evaporator temperature (referred to as a cut out point) and, in response to that predetermined cut out point, which is typically at or below the freezing point of water, opens the electrical circuit that provides electricity to the compressor control device, thereby causing the control device to disengage and, consequently, turning off the system compressor. As a result, the evaporator temperature rises until it reaches a predetermined upper temperature (a cut in point) and in response to the cut in point, the control device closes the electrical circuit that provides electricity to the compressor control device causing it to engage and, consequently, turning on the system compressor. The compressor stays on until the evaporator temperature reaches the cut out point and the cycle then repeats.

A thermostat is a conventional operating control device employed in heat transfer systems to detect and respond to changes in temperature, such as predetermined lower and upper evaporator temperatures at an evaporator core. A thermostat is a thermally activated switch that employs a temperature dependent element, e.g., a probe, which responds to changes in temperature and communicates those temperature changes to an electrical switch mechanism, which controls the flow of electricity to a downstream device, such as compressor control device.

Conventionally, thermostats for use in heat exchange systems are mechanical devices that utilize a probe that includes a capillary tube containing a refrigerant that expands or contracts in response to changes in temperature. The probe is in operable connection with a thermostatic switch mechanism that includes contact points that open at a specified lower temperature due to contraction of the capillary tube refrigerant and close at a specified upper temperature due to refrigerant expansion. When the thermostat contact points open, the electrical circuit breaks and, when the thermostat contact points close, the electrical circuit is restored.

U.S. Pat. Nos. 5,083,437 and 5,162,774 describe a remotely changeable thermostat for a refrigeration or air conditioning system that has a fluid filled capsule with a diaphragm that is movably responsive to fluid expansion and contraction within the capsule and actuates a compressor power switch via a lever means. A separate remote user activated switch energizes an electrical actuator for moving the fulcrum of a lever means to change the sensed temperature of the evaporator at which the power switch is actuated.

More recently, mechanical thermostats are being replaced with electronic thermostats that, like the mechanical thermostats, are thermally actuated switches that open and close an electrical circuit that controls a downstream device. In an electronic thermostat, the functionality of the capillary tube and contact points is achieved by a thermistor, such as a positive temperature coefficient (PTC) or a negative temperature coefficient (NTC) resistor, and a control circuit that amplifies thermistor resistance and electronically activates and deactivates as a function of temperature at the thermistor, thereby opening and closing the electrical circuit that controls a downstream device.

Thermostats that are used in conjunction with heat exchange systems, including portable refrigerators and air conditioning systems, have a limited life-span and, therefore, often must be replaced during the useful life of the heat exchange system with which they are used. Consequently, such thermostats are frequently configured for ease of accessibility and replacement by a service technician or end-user.

It is well understood that frequently-repeated on and off cycles, i.e., short cycling, exert wear and tear on the compressor and reduces its operational life. It is, therefore, desirable to be able to control the time elapsed from when a compressor is turned on and when it is turned off without regard to whether the evaporator first reaches a cut in point or a cut out point, respectively. This functionality can be achieved by employing a thermostat that not only detects evaporator temperature but also tracks the elapsed time between cut in and cut out points and responds to the cut in and cut out points secondarily to responding to the elapsed time between cut in and cut out points.

SUMMARY OF THE DISCLOSURE

The present disclosure provides electronic thermostats, in particular modular self-contained electronic thermostats, which may be suitably employed in operable combination with heat transfer systems, such as refrigeration systems or air conditioning systems, which include an evaporator, a compressor, and a compressor control device, such as an electromagnetic clutch (e.g., for a mechanical compressor) or a fluid flow valve (e.g., for a hydraulic compressor), that controls whether the compressor is operational.

The presently disclosed electronic thermostats comprise a temperature dependent electrical resistance element, a control circuit, and a programmable microprocessor, which is programmed with predetermined cut in and cut out points (i.e., upper and lower temperatures) and predetermined elapsed times between cut in and cut out points, which ensure a minimum cycle time for a component the operation of which is controlled by an electronic thermostat as provided herein.

The electronic thermostats disclosed herein may be suitably employed in heat transfer systems comprising an evaporator, a compressor, and a compressor control device to detect: (1) when the evaporator temperature drops below a predetermined cut out point (typically at or below 32° F.) and the length of time elapsed since the previous cut in point and (2) when the evaporator temperature rises to a predetermined cut in point and the length of time elapsed since the previous cut out point. Based upon those temperatures and elapsed times, the electronic thermostats are configured to switch off or on an electrical signal to a compressor control device thereby causing the control device to disengage or engage and the compressor to turn off or on, respectively.

Thus, the presently disclosed electronic thermostats will find application in heat transfer systems where it is desirable to limit excessive compressor cycling by requiring the passage of a minimum time period from compressor control device engagement to compressor control device disengagement and from compressor control device disengagement to compressor control device engagement.

The electronic thermostats disclosed herein are designed to detect one or more predetermined temperature(s) and, upon detecting the predetermined temperature(s), to control the flow of electricity through an electric circuit to a device to which the thermostat is connected. When the electric circuit is closed, electricity flows to the device and when the electric circuit is open, electricity flow to the device is prevented.

More specifically, the electronic thermostats disclosed herein may be suitably employed in combination with a heat transfer system comprising an evaporator, a compressor, and a compressor control device. In such an application, electronic thermostats can be configured to detect one or more predetermined temperature(s) at, for example, an evaporator core and to control the flow of electricity to a device, such as a compressor control device that is in operable combination with a compressor. When the electronic thermostat detects a first, lower, temperature (i.e., a cut out temperature or cut out point), the electronic thermostat opens the electric circuit to the compressor control device, which causes the control device to become disengaged and the compressor to stop functioning. When the electronic thermostat detects a second, higher, temperature (i.e., a cut in temperature or cut in point), the electronic thermostat closes the electric circuit to the compressor control device, which causes the control device to become engaged and the compressor to function.

The electronic thermostats disclosed herein comprise a temperature dependent electrical resistance element, a control circuit, and a programmable microprocessor, wherein the temperature dependent electrical resistance element is in electrical contact with the control circuit and the programmable microprocessor.

The temperature dependent electrical resistance element can be a thermistor, a resistance temperature detector (RTD), or a thermocouple. Suitable thermistors include positive temperature coefficient (PTC) resistors (posistors) and negative temperature coefficient (NTC) resistors. Suitable PTC and NTC resistors that may be used in the presently disclosed electronic thermostats are available from EPCOS AG (Munich, Germany) and from QXC (Suzhou Qinxinchuang Electronic Science & Technology Co., Ltd.) For example, a suitable thermistor is QXC1011008, Red Dot Part No. RD-5-14251-0 (Red Dot, Corp.; Tukwila, Wash.).

The electronic thermostats disclosed herein are designed to operate with a DC voltage source of between about 9 volts DC and about 32 volts DC and are configured as dual voltage electronic thermostats for use with DC voltage sources of either 12 volts or 24 volts. These electronic thermostats are rated for handling downstream device currents, such as compressor control device currents, of about 6 amps at 12 volts DC and about 3 amps at 24 volts DC. Thus, the electronic thermostats may be employed in standard 12 volt DC and 24 volt DC systems, for example heat transfer systems, including 12 volt DC and 24 volt DC air conditioning or refrigeration systems, such as portable 12 volt DC and 24 volt DC air conditioning or refrigeration systems, in particular portable 12 volt DC and 24 volt DC air conditioning systems that are designed and configured for mobile applications, such as automotive and heavy truck applications.

The presently disclosed electronic thermostats can further comprise a connector, such as a mating connector, that removably connects the electronic thermostat to a 12 volt DC or a 24 volt DC voltage source, such as a 12 volt DC or a 24 volt DC voltage source provided by a portable air conditioning system.

The electronic thermostats include ground, power, and load wiring connections and comprise control circuitry that is configured such that the power and load connections can be reversed, which prevents incorrect connections between the electronic thermostat and the power source. When power is applied to a first connection, the circuitry allows the second connection to become the interrupted circuit. Likewise, when power is applied to a second connection, the circuitry switches the interrupted circuit to the first connection.

Mating connectors typically comprise two terminals that removably connect the electronic thermostat to a voltage source and comprise a ground connector, such as a quick disconnect, which removably connects the electronic thermostat to ground. The two terminals of the mating connector can be identical in size and shape and can, therefore, removably connect to a voltage source in either of the two possible orientations.

Suitable mating connectors for use with the presently disclosed electronic thermostats include 2-terminal unsealed connectors that can mate, in both of two possible orientations, with a female connector, such as a female automotive connector, for example, the Delphi automotive connector 2P female connector (Part No. 02973407; Delphi, Solon, Ohio).

Programmable microprocessors can be programmed to respond to a preset cut out temperature by directing the control circuit to switch off the flow of electricity to a downstream device, such as a compressor control device, and to respond to a preset cut in temperature by directing the control circuit to switch on the flow of electricity to the downstream device.

In the electronic thermostats disclosed herein, programmable microprocessors can, for example, be programmed to respond to a preset cut out temperature of between about 27° F. and about 35° F., or between about 28° F. and about 34° F., or between about 29° F. and about 33° F., or between about 30° F. and about 32° F., or about 31° F.

In the electronic thermostats disclosed herein, programmable microprocessors can, for example, be programmed to respond to a preset cut in temperature of between about 35° F. and about 43° F., or between about 36° F. and about 42° F., or between about 37° F. and about 41° F., or between about 38° F. and about 40° F., or about 39° F.

The electronic thermostats disclosed herein are designed and configured to detect a preset cut out temperature or a preset cut in temperature within a tolerance of less than ±3° F., or less than ±2° F., or about ±1° F.

The programmable microprocessor can be programmed to limit the frequency at which the electronic thermostat control circuit switches on and switches off the flow of electricity to a downstream device. For example, the programmable microprocessor can be programmed to limit on-off cycling of a compressor within a heat exchange system by limiting the frequency of compressor control device on-off cycles that results from the electronic thermostat control circuit switching on and switching off the flow of electricity to the compressor control device.

In accordance with those aspects of the presently disclosed electronic thermostats, programmable microprocessors can be programmed to respond to a preset cut out temperature by first determining whether a preset time has elapsed since the temperature dependent electrical resistance element detected the preset cut in temperature, wherein if the elapsed time is less than the preset time, the programmable microprocessor directs the control circuit to maintain the flow of electricity to the downstream device and wherein when the preset time has elapsed the programmable microprocessor directs the control circuit to switch off the flow of electricity to the downstream device.

Within certain aspects, programmable microprocessors can be programmed to respond to a preset cut out temperature by directing the control circuit to switch off the flow of electricity to the downstream device after a preset elapsed time of from about 0 seconds to about 2 seconds, or about 0.5 seconds to about 1.5 seconds, or about 1 second. It will be understood that the desired elapsed time will depend upon the nature of the application contemplated and the frequency of on-off cycling desired for that application.

Similarly, programmable microprocessors can be programmed to respond to a preset cut in temperature by first determining whether a preset time has elapsed since the temperature dependent electrical resistance element detected the preset cut out temperature, wherein if the elapsed time is less than the preset time, the programmable microprocessor directs the control circuit to continue to prevent the flow of electricity to the downstream device and wherein when the preset time has elapsed the programmable microprocessor directs the control circuit to switch on the flow of electricity to the downstream device.

Within certain aspects, programmable microprocessors can be programmed to respond to a preset cut in temperature by directing the control circuit to switch on the flow of electricity to the downstream device after a preset elapsed time of from about 9 seconds to about 19 seconds, or about 11 seconds to about 17 seconds, or about 13 seconds to about 15 seconds, or about 14 seconds. It will be understood that the desired elapsed time will depend upon the nature of the application contemplated and the frequency of on-off cycling desired for that application.

Within other aspects, programmable microprocessors can be programmed to respond to a preset cut in temperature by directing the control circuit to switch on or off the flow of electricity to the downstream device after a total, combined, preset elapsed time, which includes an elapsed time from a previous cut in point plus an elapsed time from a previous cut out point. of from about 5 seconds to about 30 seconds, or about 10 seconds to about 25 seconds, or about 15 seconds to about 20 seconds, or about 15, 16, 17, 18, 19, or 20 seconds. It will be understood that the desired total elapsed time will depend upon the nature of the application contemplated and the frequency of on-off cycling desired for that application.

The programmable microprocessor can be further programmed to shut down a system to which it is connected if the source voltage drops below a certain voltage, such as below 9 volts DC, or rises above a certain voltage, such as above 32 volts DC. The programmable microprocessors can also be programmed to allow for electronic calibration, wherein individual variation between temperature dependent electrical resistance elements and resulting from the cumulative electronics can be compensated for in a single calibration step.

Suitable programmable microprocessors for use in the electronic thermostats of this disclosure include microprocessors available from Atmel (San Jose, Calif.), Texas Instruments (Dallas, Tex.), Freescale (Austin, Tex.), Fujitsu Semiconductor (Sunnyvale, Calif.), STMicroelectronics (Geneva, Switzerland), and Microchip Technology Inc. (Chandler, Ariz.). For example, a suitable microprocessor for the presently disclosed electronic thermostats is the Atmel Attiny13.

The present disclosure further provides methods associated with the use of the electronic thermostats disclosed herein, including methods for detecting cut off and cut in temperatures in a heat transfer system, including at an evaporator core, and for controlling or limiting the frequency of on and off compressor cycling, which methods comprise programming a programmable microprocessor to respond to signals received from a temperature dependent electrical resistance element, calculating the time elapsed between the last detected cut in point and a detected cut out point and/or the time elapsed between the last detected cut out point and a detected cut in point, and after a suitable duration, switching on or switching off the flow of electricity to a downstream component, such as a compressor control device.

These and other aspects and advantages of the present disclosure will be readily understood and appreciated by those skilled in the art from the following detailed description in view of the accompanying drawings.

DETAILED DESCRIPTION

The present disclosure provides electronic thermostats that are designed and configured for use in heat transfer systems. As used herein, the term "heat exchange system" includes "refrigeration system" and "air conditioning system" such as, for example, a mobile air conditioning system, such as an automotive, heavy trucking, agricultural, construction, and mining equipment air conditioning system; a stationary air conditioning system; stationary refrigeration equipment, such as a refrigeration and freezer container and a storage refrigerator and freezer; and a building heating ventilation and air conditioning system.

The terms "heat transfer," "refrigeration," and "air conditioning" are not intended to be limiting. It will be understood that the presently disclosed electronic thermostats can be modified and configured for use with cooling systems, heating systems, and systems that interchangeably heat and cool.

Heat exchange systems include an evaporator, a compressor, a condenser, and an expansion device. Such systems also commonly include one or more additional device(s) to enhance system functionality such as, for example, thermostats, pressure sensors, and switches to engage and disengage components of the system thereby enhancing system performance and/or preventing damage due to system operation under undesirable conditions or excessive duty cycles.

Figure 1:
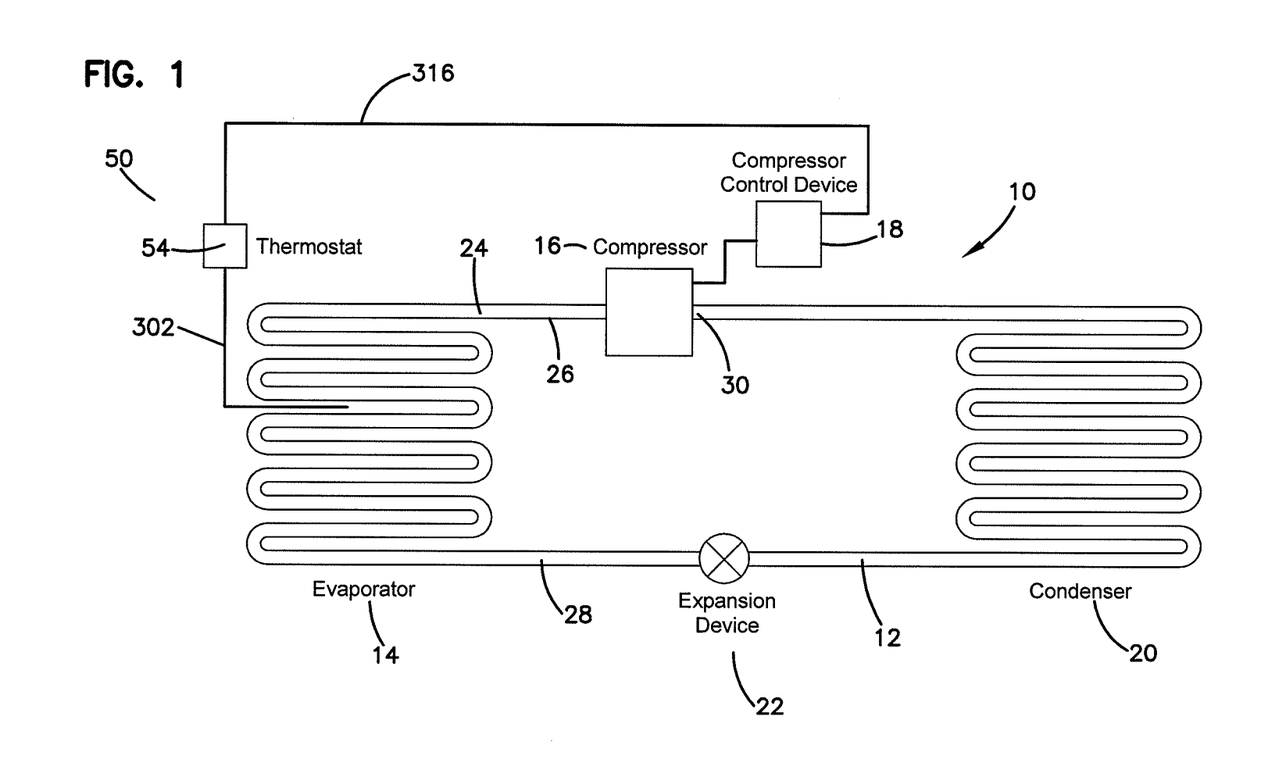
FIG. 1 is a simplified schematic diagram of a heat transfer system suitable for use with the presently disclosed electronic thermostats.

With reference to FIG. 1, a heat transfer system is generally designated by the numeral 10. For convenience, the electronic thermostats are described herein in connection with a vehicle air conditioning system such as may be used for cars and trucks. However, this exemplary description is only for convenience, ease of explanation, and clarity. This description should not be construed in a limiting sense.

For this reason, the heat transfer system components are described in generic terms without specific detail because they form no particular part of the present disclosure except as specifically noted herein. The presently disclosed electronic thermostats are suitable for use with any type of heat transfer system including, but not limited to, commercial refrigeration, heat pump systems, residential air conditioning, industrial air conditioning and so forth. The presently described electronic thermostats are particularly useful for vehicle air conditioning because of their small size, modularity, ease of installation, low power consumption, and fast response to system conditions.

Furthermore, the present electronic thermostats are not limited to use with specific evaporators, compressors, and/or compressor control devices, but can be used to determine temperatures of any evaporator core and to engage and disengage any of a wide variety of compressor control devices.

In general, the heat transfer system 10 includes a refrigerant 12, an evaporator 14, a compressor or pump 16, a compressor control device 18, a condenser 20, and an expansion device 22. As shown, refrigerant 12 flows continuously throughout the heat transfer system. The evaporator 14 typically is positioned proximate to ambient air, such as passenger compartment air, over cooling fins on the evaporator so that the refrigerant 12 absorbs heat from the ambient air.

The compressor 16 draws gaseous refrigerant 12 through a suction line 26 from the evaporator outlet 24. The compressor 16 raises the pressure of the gaseous refrigerant 12, typically to an operating pressure of several hundred PSIA. From the compressor outlet 30, the refrigerant 12 flows to the condenser 20 where it is cooled to a liquid state. Cooling of the refrigerant 12 can be regulated by operation of a condenser fan (not shown). Compressor 16 can be in an active state or an inactive state, which is controlled by compressor control device 18 being engaged or disengaged, respectively.

The expansion device 22 may be an expansion valve that is used to regulate the flow of high pressure liquid refrigerant 12 to the evaporator inlet 28 while dropping the pressure of the refrigerant 12 to the operating pressure of the evaporator 14. As the low pressure liquid refrigerant 12 passes through the evaporator 14, it absorbs heat from the ambient air and vaporizes or boils off.

In a typical heat transfer system 10, it is often desirable that only vaporous refrigerant flow into the compressor 16 from the evaporator 14. Thus, the refrigerant 12 will typically be in or nearly in a completely vapor state by the time it exits the evaporator 14. For heat transfer systems that operate in dynamic environments where the ambient load can change significantly, as well as other dynamic conditions, the heat transfer system 10 may start to operate in a "wet" state or with a higher wetness than under normal steady state conditions. This is particularly so for systems designed to operate at low superheat conditions wherein some degree of wetness is expected.

Figure 2A:
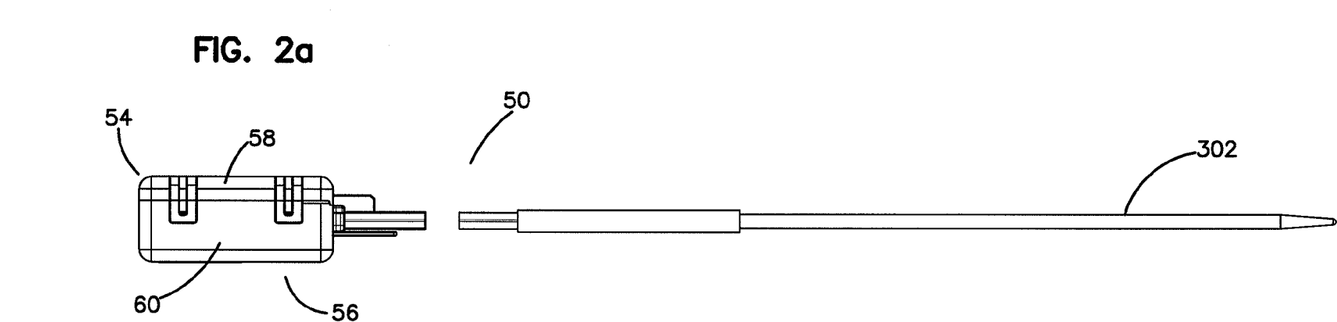
FIG. 2 is a plan diagram showing a side view (FIG. 2a) and a top view (FIG. 2b) of an electronic thermostat according to the present disclosure.
Figure 2B:
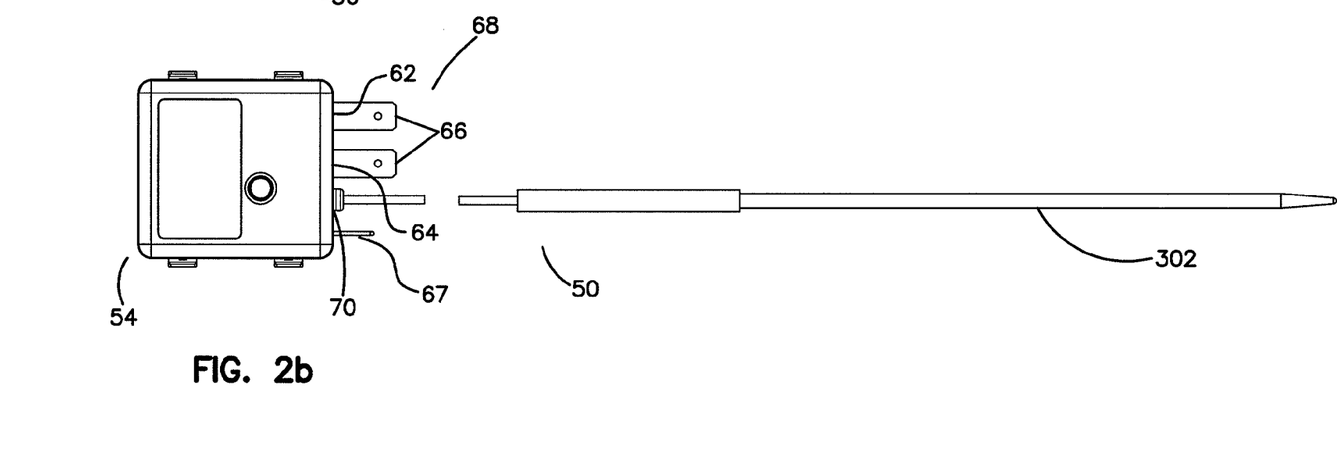

With reference to FIG. 2a (side) and FIG. 2b (top), an electronic thermostat of the present disclosure is designated by the numeral 50, which includes a temperature dependent electrical resistance element 302 and thermostat control unit 54 that includes a housing 56 having a top section 58 and a bottom section 60. Housing 56 is configured to encompass an electronic thermostat control circuit 300 (not shown in FIGS. 2*a* and 2*b*) and forms recesses 62 and 64 through which the two terminals 66 of mating connector 68 protrude and recess 70 through which temperature dependent electrical resistance element 302 is received by housing 56 and is in electrical contact (not shown) with electronic thermostat control circuit 300 (not shown).

The mating connector 68 can include two terminals 66, such as unsealed terminals, which are generally of the same size and shape and, optionally are of the same size, shape, and material, which are configured to be received by a corresponding female connector (not shown) fixably mounted to the heat transfer system 10. Mating connector 68 can, for example, be a two cavity connector, which does not also contain a ground connection. Generally, with a two cavity connector, a ground connection is connected with an additional terminal. In addition to the two terminals 66, mating connector 68 also includes a ground connector 67, such as a quick disconnect, for example Molex 19003-0052 (not shown). This configuration permits interchangeability with standard female connectors in current use with conventional mechanical thermostats.

In addition, the electronic thermostat control circuit 300 (not shown in FIG. 2), is designed and configured to permit electrical connectivity with a corresponding female connector without regard to mating connector 68 terminal 66 orientation relative to female connector orientation, thereby ensuring ease of installation by an end user without regard to which connector terminal is connected to power and which connector terminal is connected to load. One exemplary mating connector 68 that may be suitably employed with the electronic thermostat 50 of the present disclosure is Delphi 02973407 2-terminal unsealed connector.

In use with a typical heat transfer system, electronic thermostat control circuit 300 controls, in response to lower and higher detected temperatures at evaporator 14, the opening and closing, respectively, of an electric circuit that provides electricity to compressor control device 18. When the electric circuit is closed, electricity flows to compressor control device 18, which causes compressor control device 18 to engage and when the electric circuit is open, electricity flow to compressor control device 18 is prevented, which causes compressor control device 18 to disengage. Lower (cut out) and higher (cut in) evaporator core temperatures are detected by temperature dependent electrical resistance element 302 and which electrical signal is controlled by electronic thermostat control circuit 300 of the present disclosure. (See FIGS. 3 and 4, described in greater detail herein).

These and other various control functions can be provided by a control algorithm that can be programmed into microprocessor 304 of electronic thermostat control circuit 300 in a known manner to maintain operating parameters or stated set points within predetermined limits.

One such important aspect employs various control algorithms to monitor evaporator 14 core temperatures and signal to the electronic thermostat control circuit 300 when a specified lower (cut out) temperature is reached and a specified length of time has passed such that the electrical circuit to the compressor control device 18 is opened thereby disengaging compressor control device 18 and, consequently, deactivating compressor 16.

Similarly, another important aspect for various control algorithms is to permit microprocessor 304 monitor evaporator 14 core temperatures and signal to the electronic thermostat control circuit 300 when a specified higher (cut in) temperature is reached and a specified length of time has passed such that the electrical circuit to compressor control device 18 is closed thereby engaging compressor control device 1 and, consequently, activating compressor 16.

As indicated above, the presently disclosed electronic thermostats 50 include a temperature dependent electrical resistance element 302 that, when used in combination with a heat transfer system, can be placed in direct thermal contact with an evaporator 14. In this configuration, the temperature dependent electrical resistance element 302 is used to detect and monitor the temperature at the evaporator 14 core. This particular location is exemplary, however, and those skilled in the art will readily appreciate that the temperature dependent electrical resistance element 302 can be positioned at other locations within a heat exchange system to detect and respond to changes in temperature.

Temperature dependent electrical resistance element 302 can be a thermistor, such as a positive temperature coefficient (PTC) or a negative temperature coefficient (NTC) resistor, a resistance temperature detector (RTD), or a thermocouple. Suitable thermistors that may be used in the presently disclosed electronic thermostats are available from EPCOS AG (Munich, Germany) and from QXC (Suzhou Qinxinchuang Electronic Science & Technology Co., Ltd.; Jiangsu, China). For example, a suitable thermistor is QXC1011008, Red Dot Part No. RD-5-14251-0 (Red Dot, Corp.; Tukwila, Wash.).

A thermistor is generally used because it can easily be monitored by electronic thermostat control circuit 300. It will be understood, however, that the presently disclosed electronic thermostats 50 are not limited to the use of a thermistor as the temperature dependent electrical resistance element 302. Another device, such as resistance temperature device, (RTDs) could also be used.

In normal use, electronic thermostat control circuit 300 controls the operation of compressor control device 18 through a contact 316 or 318 and activates and deactivates compressor 16 by engaging or disengaging control device 18 in response to evaporator 14 temperatures detected by temperature dependent electrical resistance element 302.

Figure 3:
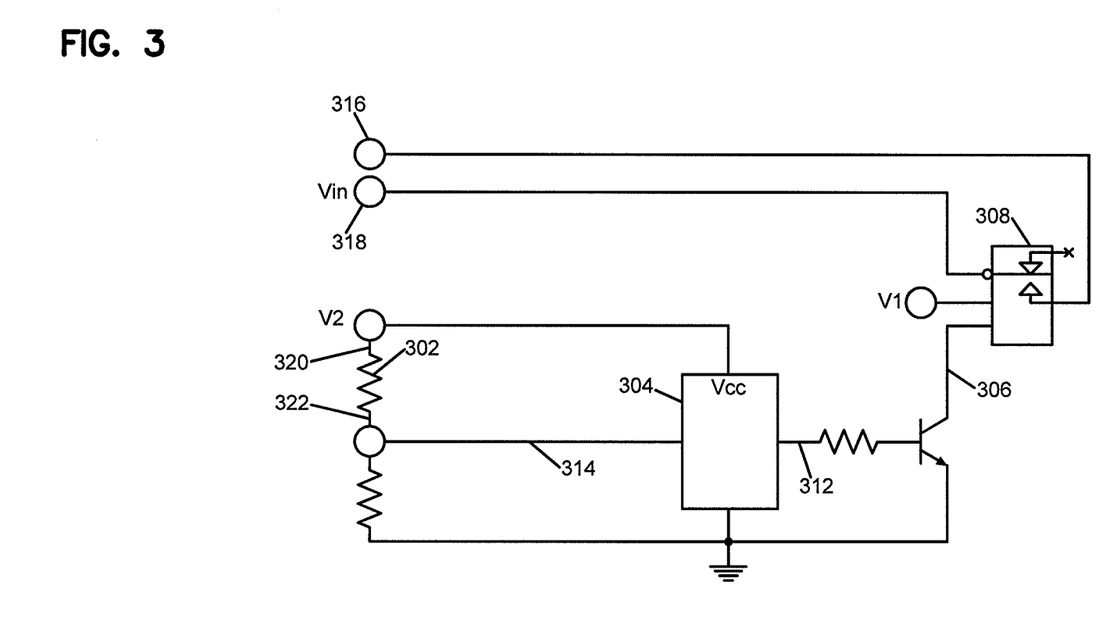
FIG. 3 is a schematic diagram of a simplified electronic thermostat control circuit according to the present disclosure.
Figure 4:
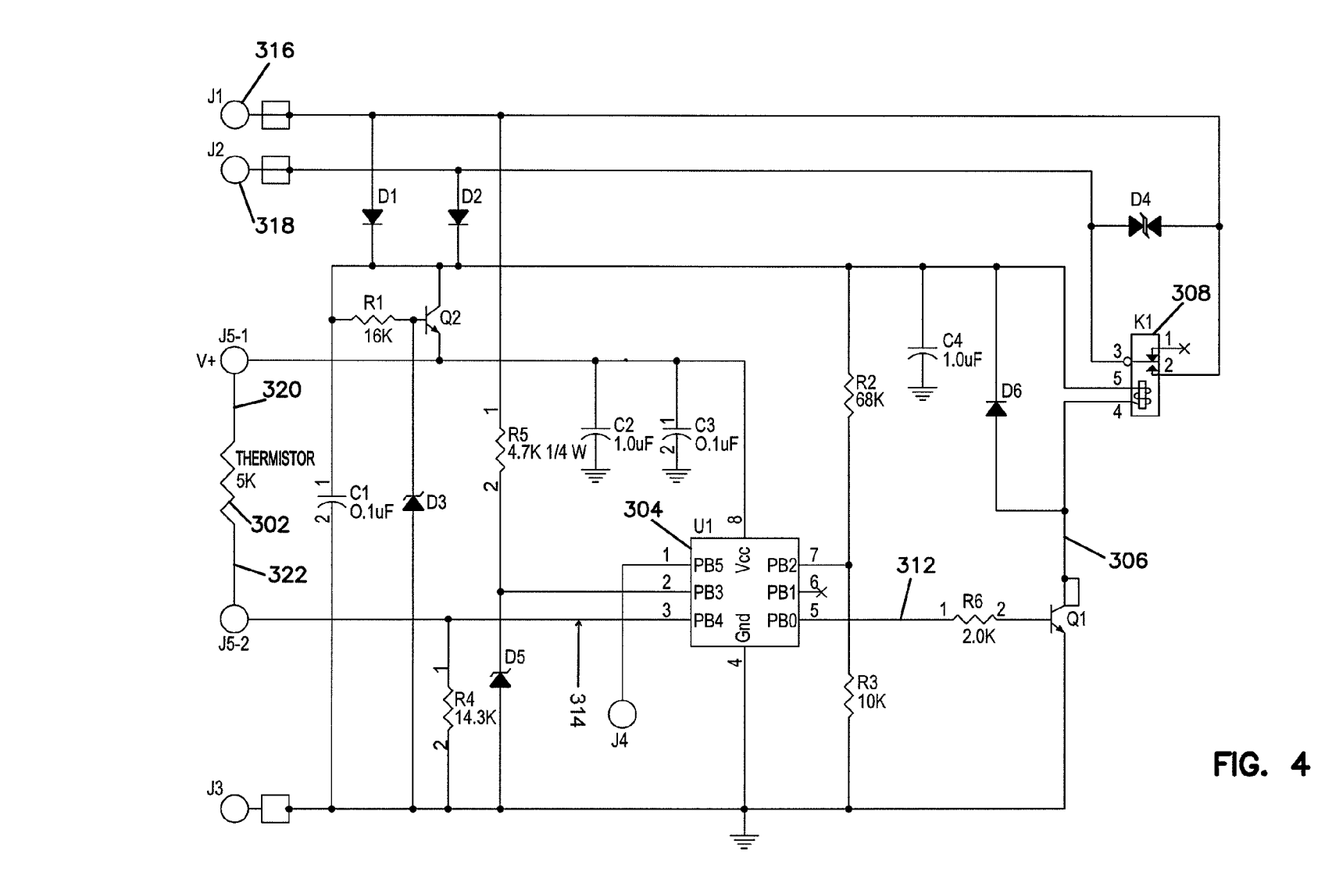
FIG. 4 is a schematic diagram of a specific embodiment of an electronic thermostat control circuit according to the present disclosure.

FIGS. 3 and 4 are schematic diagrams of electronic thermostat control circuit 300 according to the present disclosure. FIG. 3 is a simplified electronic thermostat control circuit 300, which identifies certain aspects of electronic thermostat control circuit 300 that are described herein. FIG. 4 is a schematic diagram of one embodiment of electronic thermostat control circuit 300 that serves to exemplify a control circuit that may be suitably employed in the electronic thermostat 50 disclosed herein. Those aspects of electronic thermostat control circuit 300 that are described herein by reference to FIG. 3 are also identified in FIG. 4 and the description of schematic diagram of FIG. 3 applies equally to the schematic diagram of FIG. 4.

As shown, electronic thermostat control circuit 300 is in electrical communication with temperature dependent electrical resistance element 302. The electronic thermostat control circuit 300 for operating the temperature dependent electrical resistance element 302 does not have to be part of the overall system controller but can be separately provided as a standalone circuit or separate circuit module.

As shown in FIG. 3, electronic thermostat control circuit 300 includes a microprocessor 304 and relay switch 308. Electronic thermostat control circuit 300 includes signal line 314 that is input to microprocessor 304 that uses the voltage across temperature dependent electrical resistance element 302 to calculate the resistance of temperature dependent electrical resistance element 302. Temperature dependent electrical resistance element 302 includes two electrical leads 320 and 322 that are connected to electronic thermostat control circuit 300, which can be configured together as electronic thermostat 50 or, optionally, electronic thermostat control circuit 300 and temperature dependent electrical resistance element 302 can be configured separately and removably connected by an end user.

In the electronic thermostat control circuit 300 shown in FIG. 3, temperature dependent electrical resistance element 302 is a variable resistor wherein the resistance of temperature dependent electrical resistance element 302 varies as a function of temperature. Depending upon the precise application contemplated, temperature dependent electrical resistance element 302 can be a positive temperature coefficient (PTC) thermistor (a/k/a posistor) wherein resistance increases with increasing temperature, or can be a negative temperature coefficient (NTC) thermistor wherein resistance decreases with increasing temperature. Accordingly, electronic thermostat control circuit 300 employs microprocessor 304 to detect changes in temperature at temperature dependent electrical resistance element 302.

Microprocessor 304 controls an output signal 312 in response to a threshold temperature (i.e., a cut in point or a cut out point). Microprocessor 304 receives an input voltage 314 from temperature dependent electrical resistance element 302 that directly translates to a particular temperature. If a predetermined threshold temperature is attained, microprocessor 304 sends an output signal 312 of a given voltage, individually, to relay switch 308. In this example, microprocessor 304 is capable of storing a predetermined threshold input voltage and can be customized accordingly.

In the electronic thermostat control circuit 300 shown in FIG. 3, relay switch 308 is an electrically operated switch, in particular a normally open single pole double throw (SPDT) relay. A normally open SPDT relay includes a coil and an electromagnet to move the switch from an open position to a closed position. When the switch is in an open position, electrical contacts are severed, and hence current cannot flow. In a closed position, the switch contacts with a conductor and hence permits the flow of current. Thus, in a normally open state, a SPDT relay blocks current. Once the coil in the SPDT relay is energized to a predetermined level, it creates a magnetic field that causes the switch to close and, accordingly, allows current to flow through the relay. Upon receiving output signal 306, which is controlled by output signal 312, at relay 308, the coil energizes thereby causing the switches to close and current to pass through to output contact 316 or 318, whichever one is connected to the load side. In other words, contacts 316 and 318 are interchangeable power and output terminals; that is, one of contacts 316 and 318 is the power side, while the other of contacts 316 and 318 is controlled by relay switch 308. When contact 316 has power on it, contact 318 is an output contact and is controlled by relay switch 308. When contact 318 has power on it, contact 316 is an output contact and is controlled by relay switch 308.

Microprocessor 304 is capable of programming a delayed output signal to prevent damage to electronics caused by switching too quickly. For example, if the temperature, and hence input voltage 314, drops below a predetermined threshold, microprocessor 304 sends an output signal 312 to open relay 308. To prevent damage to electronics from frequent switching, microprocessor 304 is capable of storing a preset time delay (i.e., an elapsed time) before sending output signal 312 to open the switches in relay 308. Similarly, microprocessor 304 is capable of storing a time delay (elapsed time) for sending an output signal 312 to close the switches in relay 308 when the temperature, and hence the voltage, reaches or exceeds the predetermined threshold. Although specific timing parameters are used in the example presented herein, it will be understood that these parameters may be customized accordingly depending upon the precise application contemplated.

As an optional protection, a diode (shown in FIG. 4) can be placed between output 306 of microprocessor 304 and relay 308. The coil in relay 308 acts as an inductor and thus store current. When output signals 312 and 306 turn off and relay 308 opens, current stops flowing to contact 316 or contact 318. Consequently, voltage spikes can occur, which can damage microprocessor 304 or other electronics. Thus, a diode placed between output 306 of microprocessor 304 and relay 308 allows the stored energy in the coils to flow and eventually dissipate when output signal 312 is off. Microprocessor 304 can be programmed to respond to a preset cut out and cut in temperatures. In a typical heat transfer system 10, the specific lower cut out temperature is at least about 25° F., or about 28° F., or about 31° F. and the specified higher cut in temperature is less than about 45° F., or less than about 42° F., or about 39° F. Microprocessor 304 can, therefore, be programmed to respond to a preset cut out temperature of between about 27° F. and about 35° F., or between about 28° F. and about 34° F., or between about 29° F. and about 33° F., or between about 30° F. and about 32° F., or about 31° F. Likewise, microprocessor 304 can be programmed to respond to a preset cut in temperature of between about 35° F. and about 43° F., or between about 36° F. and about 42° F., or between about 37° F. and about 41° F., or between about 38° F. and about 40° F., or about 39° F.

The electronic thermostats disclosed herein are designed and configured to detect a preset cut out temperature or a preset cut in temperature within a tolerance of less than ±3° F., or less than ±2° F., or about ±1° F.

Microprocessor 304 is programmed to determine a minimum thermal resistance and a maximum thermal resistance at temperature dependent electrical resistance element 302 at a predetermined lower cut out core temperature of evaporator 14 and at a predetermined higher cut in core temperature of evaporator 14, respectively.

The local minimum thermal resistance of temperature dependent electrical resistance element 302 and local maximum thermal resistance of temperature dependent electrical resistance element 302 are detectable as temperature dependent electrical resistance element 302 is at a minimal level and maximal level, respectively, when the temperature of evaporator 14 falls to the predetermined lower cut out evaporator 14 core temperature or rises to the predetermined higher cut in evaporator 14 core temperature.

Temperature dependent electrical resistance element 302 reaches a maximum thermal resistance when evaporator 14 reaches the predetermined lower core temperature at which point the microprocessor signals to the electronic thermostat control circuit 300 to open the circuit to and thereby disengage compressor control device 18 and deactivating compressor 16. Temperature dependent electrical resistance element 302 reaches a minimum thermal resistance when evaporator 14 reaches the predetermined higher cut out core temperature at which point the microprocessor signals to the electronic thermostat control circuit 300 to close the circuit to and thereby engaging compressor control device 18 and activating compressor 16.

Microprocessor 304 of electronic thermostat control circuit 300 permits electronic calibration of the electronic thermostat 50, which allows for individual variation in temperature dependent electrical resistance element 302 and for the cumulative electronic components of electronic thermostat control circuit 300 to be compensated for in a single calibration step.

In addition to being programmed with predetermined cut out and cut in temperatures, microprocessor 304 can be programmed to determine the length of time at which temperature dependent electrical resistance element 302 is at a minimum thermal resistance, that is, the length of time at which temperature dependent electrical resistance element 302 is at a cut out temperature. Until a predetermined length of time has passed, microprocessor 304 continues to instruct electronic thermostat control circuit 300 keep the circuit to compressor control device 18 closed thereby holding the compressor control device 18 in an engaged state and, consequently, compressor 16 in an active state. Within certain aspects, microprocessor 304 can be programmed to respond to a preset cut out temperature by directing the control circuit to switch off the flow of electricity to compressor control device 18 after a preset elapsed time of from about 0 seconds to about 2 seconds, or about 0.5 seconds to about 1.5 seconds, or about 1 second.

Similarly, microprocessor 304 can be programmed to determine the length of time at which temperature dependent electrical resistance element 302 is at a maximum thermal resistance, that is, the length of time at which temperature dependent electrical resistance element 302 is at a cut in temperature. Until a predetermined length of time has passed, microprocessor 304 continues to instruct electronic thermostat control circuit 300 keep the circuit to compressor control device 18 open thereby holding the compressor control device 18 in a disengaged state and, consequently, holding the compressor 16 in an inactive state.

Within certain aspects, microprocessor 304 can be programmed to respond to a preset cut in temperature by directing the control circuit to switch on the flow of electricity to compressor control device 18 after a preset elapsed time of from about 9 seconds to about 19 seconds, or about 11 seconds to about 17 seconds, or about 13 seconds to about 15 seconds, or about 14 seconds.

Within other aspects, programmable microprocessors can be programmed to respond to a preset cut in temperature by directing the control circuit to switch on or off the flow of electricity to the downstream device after a total, combined, preset elapsed time, which includes an elapsed time from a previous cut in point plus an elapsed time from a previous cut out point. of from about 5 seconds to about 30 seconds, or about 10 seconds to about 25 seconds, or about 15 seconds to about 20 seconds, or about 15, 16, 17, 18, 19, or 20 seconds. It will be understood that the desired total elapsed time will depend upon the nature of the application contemplated and the frequency of on-off cycling desired for that application.

Figure 5:
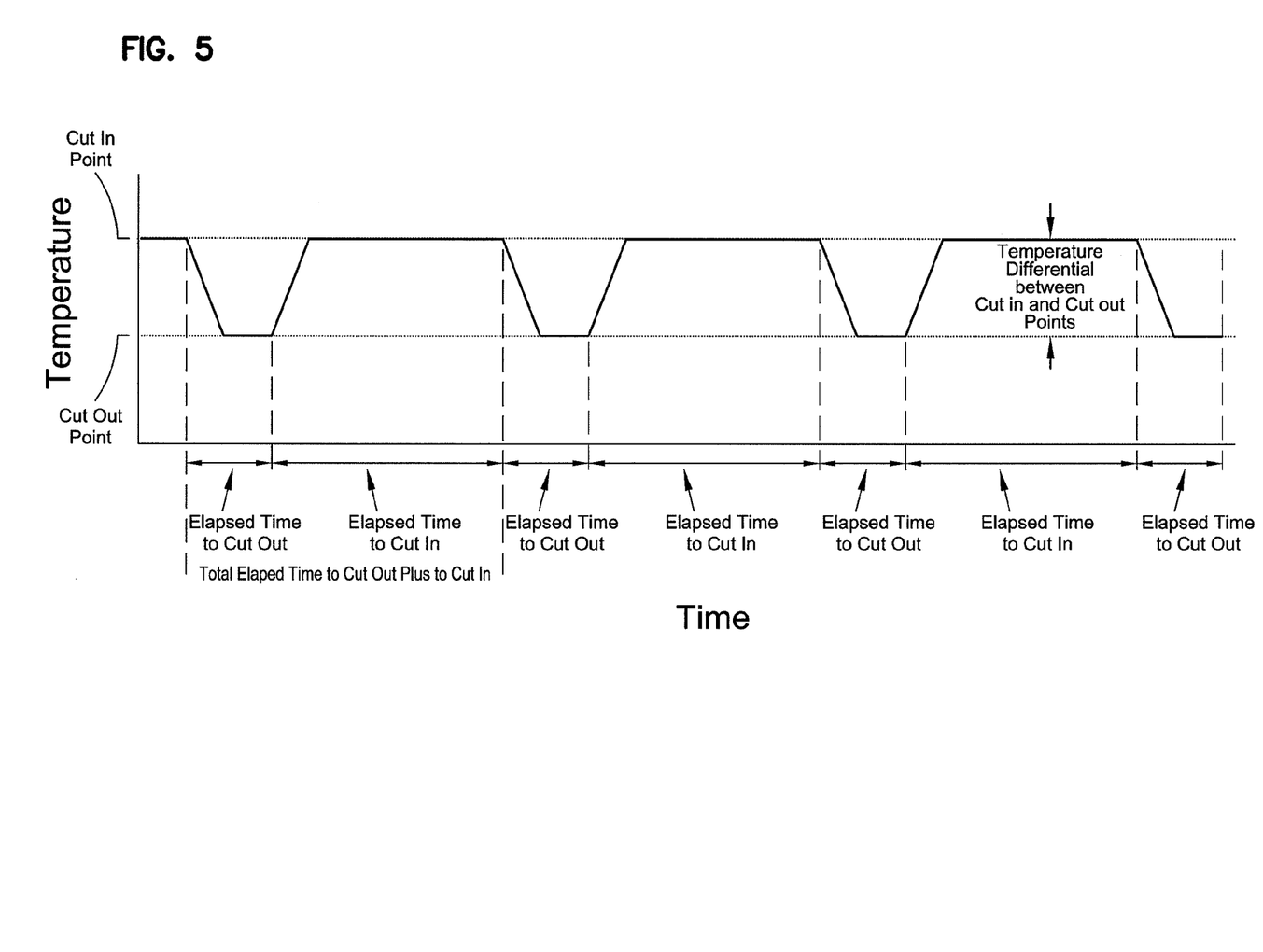
FIG. 5 is a graph representing the cut in and cut out temperatures, and elapsed times, in an exemplary electronic thermostat, which has been programmed for use in a portable, mobile, heat transfer system as described in the present disclosure.

The relationship between predetermined cut in and cut out temperatures and elapsed times are represented diagrammatically temperature in FIG. 5. Microprocessor 304 can be programmed with such timing instructions to limit the number of control device cycles to a maximum number per minute thereby reducing premature wear on compressor 16. Thus, the microprocessor 304 within the electronic thermostat 50 of the present disclosure permits programmable functionality, which allows for custom settings for temperature cut in and cut out points and for custom settings that extend or limit the duration and frequency of compressor 16 cycling, as might be recommended by the manufacturer or specifically required by the end user. It will be understood that the desired elapsed times will depend upon the nature of the application contemplated and the frequency of on-off cycling desired for that application.

Microprocessor 304 is programmed using conventional programming techniques. Microprocessor 304 uses the temperature dependent electrical resistance element 302 as a control element for detecting the temperature at the core of evaporator 14. The microprocessor 304 then uses such information as part of its control algorithm for controlling the flow of electricity to compressor control device 18. The overall system control algorithm implemented using the microprocessor 304 forms no particular part of the present disclosure.

In accordance with the present disclosure, microprocessor 304 can be programmed to determine the temperature of the evaporator 14 using the temperature dependent electrical resistance element 302.

Figure 6:
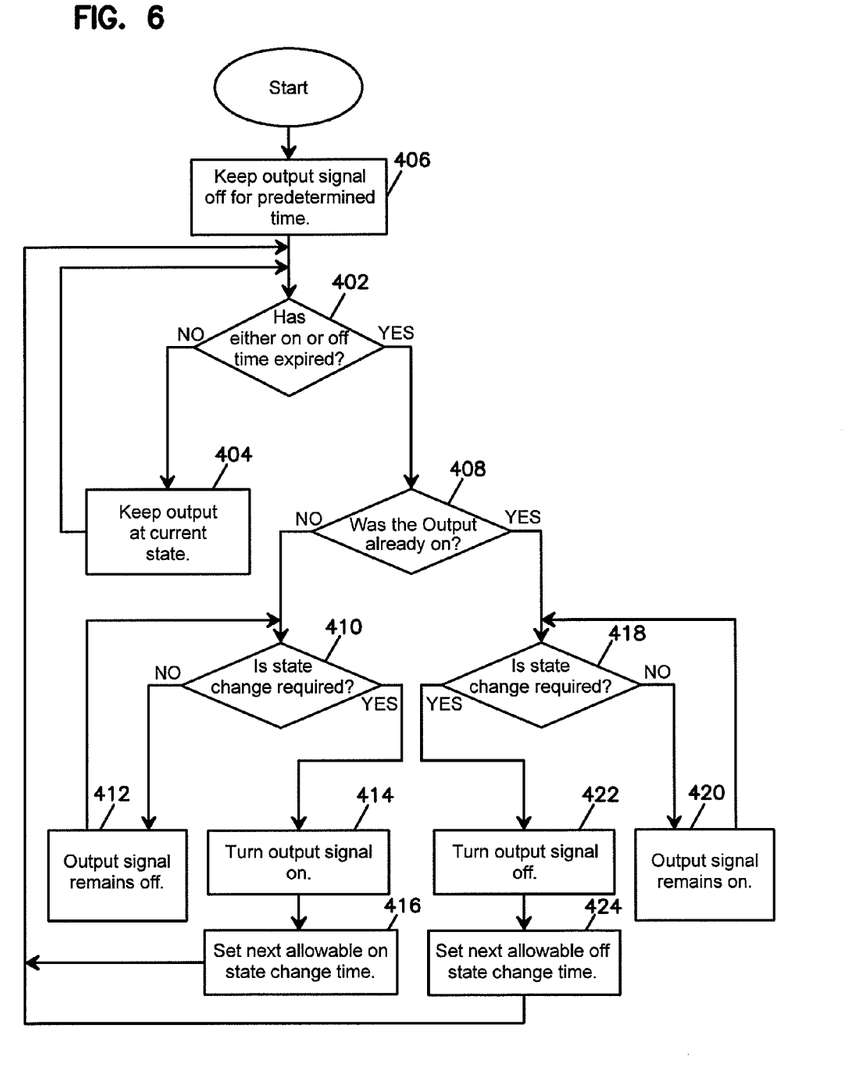
FIG. 6 is a flow diagram of a method employed by an electronic thermostat microprocessor that is programmed, as disclosed herein, with predetermined cut in and cut out temperatures and predetermined elapsed times between cut in and cut out temperatures and/or total, combined predetermined elapsed times between cut in temperature plus total predetermined elapsed times between cut out temperature, and that responds to those temperatures and elapsed times by closing or opening an electrical circuit that can control a downstream device.

FIG. 6 is one embodiment of a method 400 used by microprocessor 304 as shown and described with reference to FIGS. 3 and 4. Method 400 begins at operation 402 when microprocessor 304 determines whether the on or off time for the output signal has expired. If the time had expired, flow proceeds to operation 404, wherein the output is kept at its current state. Flow then loops back to operation 402 for another determination of whether the output signal time has expired.

Alternatively, if microprocessor 304 in operation 402 determines that the output signal has expired, flow proceeds to operation 408. In operation 408, microprocessor 304 determines whether the output was already on. If the output was off, and hence not already on, flow proceeds to operation 410. In operation 410, microprocessor 304 determines if a state change is required and accordingly, turns the output signal on. A state change is required if microprocessor 304 determines whether the voltage reading across the thermistor is at or above a predetermined threshold. As described herein, a thermistor is a temperature dependent electrical resistance element 302 having a resistance that varies with temperature. Accordingly, in operation 402, microprocessor 304 reads a voltage across a thermistor that relates directly to a particular temperature. Microprocessor 304 compares this voltage corresponding to a particular temperature to a predetermine threshold voltage. If microprocessor 304 determines that the voltage does not exceed a predetermined threshold, flow proceeds to operation 412 where the output signal remains off. Flow then proceeds back to operation 410 to continue reading voltage, and hence temperature, across the thermistor.

Alternatively, if in operation 410, microprocessor 304 determines that the voltage reading across the thermistor is at or above a predetermined threshold voltage, then a change in state from the current off state is required. Accordingly, flow proceeds to operation 414 wherein microprocessor 304 turns the output signal on. Microprocessor 304 is capable of storing a time delay for maintaining the output signal at an on state. Hence, in operation 416, microprocessor 304 sets a next allowable on the state change time. Flow then proceeds to operation 402.

If, in operation 408, microprocessor 304 determines whether the output was already on, flow proceeds to operation 418. In operation 418, microprocessor 304 determines if a state change is required. In operation 418, microprocessor 304 reads a voltage across the thermistor. If this voltage reading is above a threshold voltage that corresponds to a particular temperature, the output signal should remain on, and hence a state change is not required. Thus, flow proceeds to operation 420 and the output signal remains on.

Alternatively, if at operation 418, microprocessor 304 reads a voltage across the thermistor that is below a threshold voltage, the output signal should turn off, and hence a state change is required. Thus, flow proceeds to operation 422 and the output signal turns off. As discussed herein, microprocessor 304 is capable of storing a time delay to prevent thermostat 50 from switching too frequently. Hence, in operation 424, microprocessor 304 sets a next allowable off state change time. Flow then proceeds to operation 402.

It will be understood that, unless indicated to the contrary, terms intended to be "open" (e.g., the term "including" should be interpreted as "including but not limited to," the term "having" should be interpreted as "having at least," the term "includes" should be interpreted as "includes but is not limited to," etc.). Phrases such as "at least one," and "one or more," and terms such as "a" or "an" include both the singular and the plural.

It will be further understood that where features or aspects of the disclosure are described in terms of Markush groups, the disclosure is also intended to be described in terms of any individual member or subgroup of members of the Markush group. Similarly, all ranges disclosed herein also encompass all possible sub-ranges and combinations of sub-ranges and that language such as "between," "up to," "at least," "greater than," "less than," and the like include the number recited in the range and includes each individual member.

All references cited herein, whether supra or infra, including, but not limited to, patents, patent applications, and patent publications, whether U.S., PCT, or non-U.S. foreign, and all technical and/or scientific publications are hereby incorporated by reference in their entirety.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

Moreover, the figures are intended to provide an exemplary control circuit and microprocessor algorithm that can be employed by an electronic thermostat according to the present disclosure. Those skilled in the art will appreciate that various set point values and other predetermined parameters (e.g., cut in and cut out points and time durations) that are identified herein are exemplary in nature and will be determined, as appropriate, for each application.

What is claimed is:

1. An electronic thermostat for use in a mobile heat transfer system, comprising:
    (a) a resistive element with a temperature dependent electrical resistance; and
    (b) a control circuit comprising a microprocessor;
        wherein said resistive element
            (i) is configured for monitoring a temperature at an evaporator core of said mobile heat transfer system and
            (ii) is in electrical contact with said control circuit and is configured for thermal contact with said evaporator core,
        wherein said microprocessor
            (i) is programmed to limit a frequency at which a compressor of said mobile heat transfer system cycles,
            (ii) enables a first-type event that transitions said control circuit from a first state to a second state in response to an electrical resistance of the resistive element corresponding to a predetermined temperature of the evaporator core cut in point and
            (iii) enables a second-type event that transitions said control circuit from said second state to said first state in response to an electrical resistance of the resistive element corresponding to a predetermined temperature of the evaporator core cut out point
        wherein a current first-type event does not occur until at least a first predetermined minimum time has elapsed since a prior second-type event and a first preset time delay has elapsed since the response to the electrical resistance corresponding to the predetermined temperature cut in point,
        wherein a current second-type event does not occur until at least a second predetermined minimum time has elapsed since a prior first-type event and a second preset time delay has elapsed since the response to the electrical resistance corresponding to the predetermined temperature cut out point and
        wherein said microprocessor is further programmed to enable a second-type event when the control circuit is in the second state and a source voltage connected to the control circuit is less than a predetermined voltage threshold.

2. The electronic thermostat of claim 1 wherein said control circuit further comprises a relay that controls an output signal from said control circuit, wherein when said relay is switched on said output signal is on and wherein when said relay is switched off said output signal is off.

3. The electronic thermostat of claim 2 wherein said microprocessor controls whether said relay is switched on or switched off.

4. The electronic thermostat of claim 2, wherein said relay is switched on when said microprocessor detects said predetermined temperature cut in point and wherein said relay is switched off when said microprocessor detects said predetermined temperature cut out point.

5. The electronic thermostat of claim 1, wherein said predetermined temperature cut out point is a temperature of between about 27° F. and about 35° F., or between about 28° F. and about 34° F., or between about 29° F. and about 33° F., or between about 30° F. and about 32° F.

6. The electronic thermostat of claim 1, wherein said predetermined temperature cut out point is a temperature of about 31° F.

7. The electronic thermostat of claim 1, wherein said predetermined temperature cut in point is a temperature of between about 35° F. and about 43° F., or between about 36° F. and about 42° F., or between about 37° F. and about 41° F., or between about 38° F. and about 40° F.

8. The electronic thermostat of claim 1, wherein said predetermined temperature cut in point is a temperature of about 39° F.

9. The electronic thermostat of claim 1, wherein said electronic thermostat is configured to detect said electrical resistance corresponding to said predetermined temperature cut out and said predetermined temperature cut in within a temperature tolerance of less than ±3° F.

10. The electronic thermostat of claim 1, wherein said electronic thermostat is configured to detect said electrical resistance corresponding to said predetermined temperature cut out and said predetermined temperature cut in within a temperature tolerance of about ±1° F.

11. The electronic thermostat of claim 2, wherein said microprocessor is programmed such that upon detecting said electrical resistance corresponding to said predetermined temperature cut in point, said microprocessor prevents said current first-type event until at least said first predetermined minimum time has elapsed since said prior second-type event.

12. The electronic thermostat of claim 1, wherein said first predetermined minimum time is from about 9 seconds to about 19 seconds, or from about 11 seconds to about 17 seconds, or from about 13 seconds to about 15 seconds.

13. The electronic thermostat of claim 1, wherein said first predetermined minimum time is about 14 seconds.

14. The electronic thermostat of claim 2, wherein said microprocessor is programmed such that upon detecting said electrical resistance corresponding to said predetermined temperature cut out point, said microprocessor prevents said current second-type event until at least said second predetermined minimum time has elapsed since said prior first-type event.

15. The electronic thermostat of claim 1, wherein said second predetermined minimum time is from about 0 seconds to about 2 seconds, or from about 0.5 seconds to about 1.5 seconds.

16. The electronic thermostat of claim 1, wherein said source voltage is a DC voltage.

17. The electronic thermostat of claim 1 wherein said microprocessor is programmed to allow for single step electronic calibration of said resistive element.

\* \* \* \* \*